US012613578B2

(12) United States Patent
Kato

(10) Patent No.: US 12,613,578 B2
(45) Date of Patent: Apr. 28, 2026

(54) TACTILE SENSE TRANSMISSION DEVICE AND TACTILE SENSE TRANSMISSION METHOD

(71) Applicant: TDK CORPORATION, Tokyo (JP)

(72) Inventor: Takashi Kato, Tokyo (JP)

(73) Assignee: TDK CORPORATION, Tokyo (JP)

( * ) Notice: Subject to any disclaimer, the term of this patent is extended or adjusted under 35 U.S.C. 154(b) by 66 days.

(21) Appl. No.: 18/649,144

(22) Filed: Apr. 29, 2024

(65) Prior Publication Data

US 2025/0021161 A1     Jan. 16, 2025

(30) Foreign Application Priority Data

Jul. 13, 2023     (JP) .................................. 2023-115142

(51) Int. Cl.
*G08B 21/00* (2006.01)
*B06B 1/06* (2006.01)
(Continued)

(52) U.S. Cl.
CPC ............ *G06F 3/016* (2013.01); *B06B 1/0648* (2013.01); *G01L 1/16* (2013.01); *G06F 3/16* (2013.01)

(58) Field of Classification Search
CPC ...... G02F 1/29; G02F 1/294; G02F 1/133345; G02F 1/134309; G02F 1/13439; G02F 1/133371; G02F 1/291; G05B 19/054; G05B 2219/1109; G05B 2219/1113; G05B 2219/15072; G05B 13/028; G05B 19/056; G05B 19/4183; G05B 19/4184; G05B 19/41845; G05B 19/4185; G05B 19/41865; G05B 19/41875; G05B 2219/32287; G05B 2219/35001; G05B 2219/37337; G05B 2219/37351; G05B 2219/37434; G05B 2219/40115; G05B 2219/45004; G05B 2219/45129; G05B 23/0221; G05B 23/0229; G05B 23/024; G05B 23/0264; G05B 23/0283; G05B 23/0286; G05B 23/0289; G05B 23/0291; G05B 23/0294; G05B 23/0297; G05B 17/02; G05B 19/042; G05B 19/05; G05B 19/058;

(Continued)

(56) References Cited

U.S. PATENT DOCUMENTS

| | | | |
|---|---|---|---|
| 2006/0028095 A1* | 2/2006 | Maruyama ............. | H10N 30/50 310/316.01 |
| 2009/0063760 A1* | 3/2009 | Weddle ............... | G06F 13/1689 711/E12.001 |

(Continued)

FOREIGN PATENT DOCUMENTS

JP        2005-339298 A        12/2005

*Primary Examiner* — Daniel Previl
(74) *Attorney, Agent, or Firm* — Oliff PLC

(57) ABSTRACT

A tactile sense transmission device includes an input unit configured to generate a voltage according to a pressing force generated by contact and generate a signal based on the generated voltage; a relay unit configured to relay the signal from the input unit and adjust a value of the signal; and an output unit configured to output vibration based on the signal relayed by the relay unit. The input unit is configured by a piezoelectric sensor including a piezoelectric element, and the output unit is configured by a vibrator including a piezoelectric element and vibrating based on the signal.

6 Claims, 10 Drawing Sheets

(51) Int. Cl.

| | |
|---|---|
| *G01L 1/16* | (2006.01) |
| *G06F 3/01* | (2006.01) |
| *G06F 3/16* | (2006.01) |

(58) Field of Classification Search

CPC ...... G05B 19/41885; G05B 2219/1182; G05B 2219/14038; G05B 2219/15018; G05B 2219/15133; G05B 2219/25043; G05B 2219/25392; G05B 2219/25461; G05B 2219/25472; G05B 2219/25483; G05B 19/0426; G05B 19/418; G05B 2219/13133; G05B 2219/13144; G05B 2219/13145; G05B 2219/13148; G05B 2219/13152; G05B 2219/15061; G05B 2219/23335; G05B 2219/2642; G05B 2219/31457; G05B 2219/37537; G02B 30/00; G02B 2027/0178; G02B 2027/0187; G02B 27/017; G02B 27/0172; G02B 3/14; G02B 6/0021; G02B 6/0038; G02B 6/0055; G02B 6/0073; G02B 3/08; G02B 3/12; G02B 5/1828; G02B 5/1876; G02B 5/188; G02B 1/045; G02B 6/0036; G02B 6/0078; G02B 26/08; G02B 27/0075; G02B 6/0043; G02B 6/0095; G02B 7/38; G02B 26/004; G06F 3/011; G06F 2203/011; G06F 3/015; G06F 1/3262; G06F 18/2178; G06F 3/0412; G06F 3/0416; G06F 13/1689; G06F 13/1694; G06F 17/18; G06F 18/21; G06F 18/25; G06F 2218/12; G06F 3/0346; G06F 8/71; G06F 9/30018; G06F 9/30029; G06F 9/30101; G06F 21/32; G06F 16/532; G06F 40/40; G06F 11/1675; G06F 16/9566; G06F 3/016; G06F 16/2365; G06F 16/26; G06F 21/1014; G06F 21/6218; G06F 21/64; G06F 2221/2141; G06F 3/014; G06F 3/017; G06F 3/0233; G06F 3/0426; G06F 3/04886; G06F 3/16; A61F 2/14; A61F 2/1624; A61N 1/36025; A61N 1/0456; A61N 1/36082; A61N 2/006; A61N 1/0529; A61N 1/3603; A61N 1/36031; A61N 1/36092; A61N 2/004; A61N 1/0534; A61N 1/0526; A61N 1/0551; A61N 1/20; A61N 1/36046; A61N 1/36053; A61N 1/37205; A61N 1/37512; A61N 5/0618; G02C 7/04; G02C 7/083; G09G 2360/04; G09G 2370/16; G09G 3/32; G09G 3/02; A61M 2021/0027; A61M 2021/0055; A61M 2021/0072; A61M 21/02; A61M 2230/10; A61M 2021/0016; A61M 2021/0022; A61M 2021/0044; A61M 2021/005; A61M 2021/0077; A61M 2205/50; A61M 21/00; A61M 2021/0066; A61M 2205/52; A61M 2230/005; A61M 2005/2013; A61M 2005/2026; A61M 2005/206; A61M 2005/2073; A61M 2005/3128; A61M 2039/1083; A61M 2039/1088; A61M 2205/13; A61M 2205/14; A61M 2205/18; A61M 2205/3576; A61M 2205/502; A61M 2205/507; A61M 2205/581; A61M 2205/582; A61M 2205/583; A61M 2205/6018; G06V 40/166; G06V 40/171; G06V 40/172; G06V 40/176; G06V 20/50; G06V 40/40; G06V 40/70; G06V 10/145; G06V 10/60; G06V 40/45; G06V 40/174; G06V 10/82; G06V 40/16; G06V 40/20; G06V 40/28; G10L 13/02; G10L 15/08; G10L 15/25; G10L 15/20; G10L 15/22; G10L 2015/088; G10L 2015/223; G10L 13/00; G10L 13/027; G10L 15/16; G10L 17/02; G10L 17/04; G10L 17/10; G10L 17/18; G10L 25/84; G10L 15/24; G10L 15/26; A61B 5/6803; A61B 5/1176; A61B 5/0064; A61B 5/117; A61B 5/165; A61B 5/0022; A61B 5/0205; A61B 5/02438; A61B 5/14551; A61B 5/681; A61B 2560/0228; A61B 5/0261; A61B 5/282; A61B 5/366; A61B 5/7203; A61B 5/721; A61B 5/7221; A61B 5/7264; A61B 5/7275; A61B 5/7282; A61B 5/746; A61B 5/7475; A61B 6/4258; A61B 5/291; A61B 2562/0247; A61B 2562/0271; A61B 5/0015; A61B 5/0833; A61B 5/0836; A61B 5/091; A61B 5/097; A61B 5/6831; A61B 2560/0431; A61B 2562/0219; A61B 5/0024; A61B 5/01; A61B 5/02055; A61B 5/021; A61B 5/02416; A61B 5/0245; A61B 5/055; A61B 5/0816; A61B 5/1112; A61B 5/14532; A61B 5/14546; A61B 5/4875; A61B 5/6824; A61B 5/6826; A61B 5/7455; H04R 1/028; H04R 1/10; H04R 1/1041; H04R 2201/107; G06Q 20/40145; G06Q 50/06; G06Q 30/0601; G06Q 10/04; G06Q 10/06; G06Q 10/10; G06Q 10/101; G06Q 10/40; G06Q 20/18; G06Q 20/208; G06Q 20/389; G06Q 30/0283; G06Q 30/06; G06Q 30/0621; G06Q 30/0641; G06Q 30/08; G06Q 50/188; H04L 63/0861; H04L 63/108; H04L 1/00; H04L 25/4908; H04L 65/403; H04L 67/02; H04L 67/10; H04L 67/1095; H04L 67/141; H04L 67/75; H04L 63/123; H04L 9/50; C07C 1/04; C07C 1/0475; C07C 1/0485; C07C 1/0495; C07C 1/12; C10J 2300/0906; C10J 2300/0909; C10J 2300/0916; C10J 2300/1659; C10J 2300/1662; C10J 2300/1665; C10J 2300/1671; C10J 2300/1684; C10J 3/00

USPC ....... 340/407.1, 965, 426.19, 515, 506, 526, 340/539.21, 539.22, 539.23–539.24, 340/545.3, 566, 683, 407.2

See application file for complete search history.

(56) References Cited

U.S. PATENT DOCUMENTS

| | | | | |
|---|---|---|---|---|
| 2009/0082882 A1* | 3/2009 | Parfitt | .................. | G05B 19/054 |
| | | | | 700/14 |
| 2010/0286571 A1* | 11/2010 | Allum | .................... | A61B 5/486 |
| | | | | 600/595 |
| 2010/0288068 A1* | 11/2010 | Klukowski | .............. | B62D 1/16 |
| | | | | 74/492 |
| 2011/0316376 A1* | 12/2011 | Sortore | .................... | H02K 7/09 |
| | | | | 310/90.5 |
| 2013/0282117 A1* | 10/2013 | Van Heugten | ............ | A61F 2/14 |
| | | | | 623/6.22 |
| 2020/0025258 A1* | 1/2020 | Schmitz | .................. | F16D 7/025 |

\* cited by examiner

TACTILE SENSE TRANSMISSION DEVICE AND TACTILE SENSE TRANSMISSION METHOD

CROSS-REFERENCE TO RELATED APPLICATIONS

This application is based upon and claims the benefit of priority from Japanese Patent Application No. 2023-115142, filed on Jul. 13, 2023, the entire contents of which are incorporated herein by reference.

TECHNICAL FIELD

The present disclosure relates to a tactile sense transmission device and a tactile sense transmission method.

BACKGROUND

As a technology for presenting a tactile sense by vibration, for example, there is an input device described in Japanese Unexamined Patent Publication No. 2005-339298. In this conventional input device, contact by a user's finger or the like is detected by a capacitive sensor, and a drive signal is supplied to a piezoelectric actuator based on a detection result. By vibrating a contact portion of the finger by the piezoelectric actuator, a tactile sense indicating that the input has been received is presented to the user.

SUMMARY

In the conventional device as described above, the tactile sense by vibration is presented to a portion actually touched by the finger or the like. Therefore, in consideration of application to sensing or the like, there is a demand for a technology capable of transmitting a tactile sense detected at a certain position to a remote position and outputting the tactile sense. Furthermore, in the transmission of the tactile sense, high responsiveness of an output with respect to an input is also required.

The present disclosure has been made to solve the above problem, and an object of the present disclosure is to provide a tactile sense transmission device and a tactile sense transmission method capable of transmitting a tactile sense to a remote position with high responsiveness.

Solution to Problem

A tactile sense transmission device according to one aspect of the present disclosure includes: an input unit configured to generate a voltage according to a pressing force generated by contact and generate a signal based on the generated voltage; a relay unit configured to relay the signal from the input unit and adjust a value of the signal; and an output unit configured to output vibration based on the signal relayed by the relay unit, in which the input unit is configured by a piezoelectric sensor including a piezoelectric element, and the output unit is configured by a vibrator including a piezoelectric element and vibrating based on the signal.

In this tactile sense transmission device, the signal based on the voltage generated in the input unit is relayed by the relay unit, and the vibration based on the signal is output from the output unit. Therefore, in the tactile sense transmission device, a tactile sense detected by the input unit can be presented by the output unit at a remote position. Further, in this tactile sense transmission device, the input unit is configured by the piezoelectric sensor including the piezoelectric element, and the output unit is configured by the vibrator including the piezoelectric element. As described above, since both the input unit and the output unit include the piezoelectric element, high responsiveness of the output with respect to the input can be realized.

The relay unit may amplify the value of the signal and output the amplified signal to the output unit. As a result, a clearer tactile sense can be presented in the output unit.

An operating frequency of the piezoelectric sensor may be higher than an operating frequency of the vibrator. By having such a relationship of the operating frequency, the output with respect to the input can be optimized.

The input unit may have a plurality of piezoelectric sensors having different operating frequencies. In this case, a more detailed tactile sense can be presented. For example, it is possible to present a tactile sense with respect to minute unevenness in an uneven surface.

The tactile sense transmission device may further include a conversion unit configured to convert the signal from the input unit into an audio signal, and a restoration unit configured to receive the audio signal from the conversion unit via a network, restore the audio signal to a signal before conversion, and output the signal to the relay unit. In this case, the tactile sense detected by the input unit can be presented by the output unit at a further remote position via the network.

A tactile sense transmission method according to one aspect of the present disclosure includes: an input step of generating a voltage according to a pressing force generated by contact and generating a signal based on the generated voltage in an input unit configured by a piezoelectric sensor including a piezoelectric element; a relay step of relaying the signal from the input unit and adjusting a value of the signal in a relay unit; and an output step of outputting vibration based on the signal relayed by the relay unit in an output unit configured by a vibrator including a piezoelectric element.

In this tactile sense transmission method, the signal based on the voltage generated in the input unit is relayed by the relay unit, and the vibration based on the signal is output from the output unit. Therefore, in this tactile sense transmission method, a tactile sense detected by the input unit can be presented by the output unit at a remote position. Further, in this tactile sense transmission method, the input unit is configured by the piezoelectric sensor including the piezoelectric element, and the output unit is configured by the vibrator including the piezoelectric element. As described above, since both the input unit and the output unit include the piezoelectric element, high responsiveness of the output with respect to the input can be realized.

DETAILED DESCRIPTION

Hereinafter, preferred embodiments of a tactile sense transmission device and a tactile sense transmission method according to one aspect of the present disclosure will be described in detail with reference to the drawings.

First Embodiment

Figure 1:
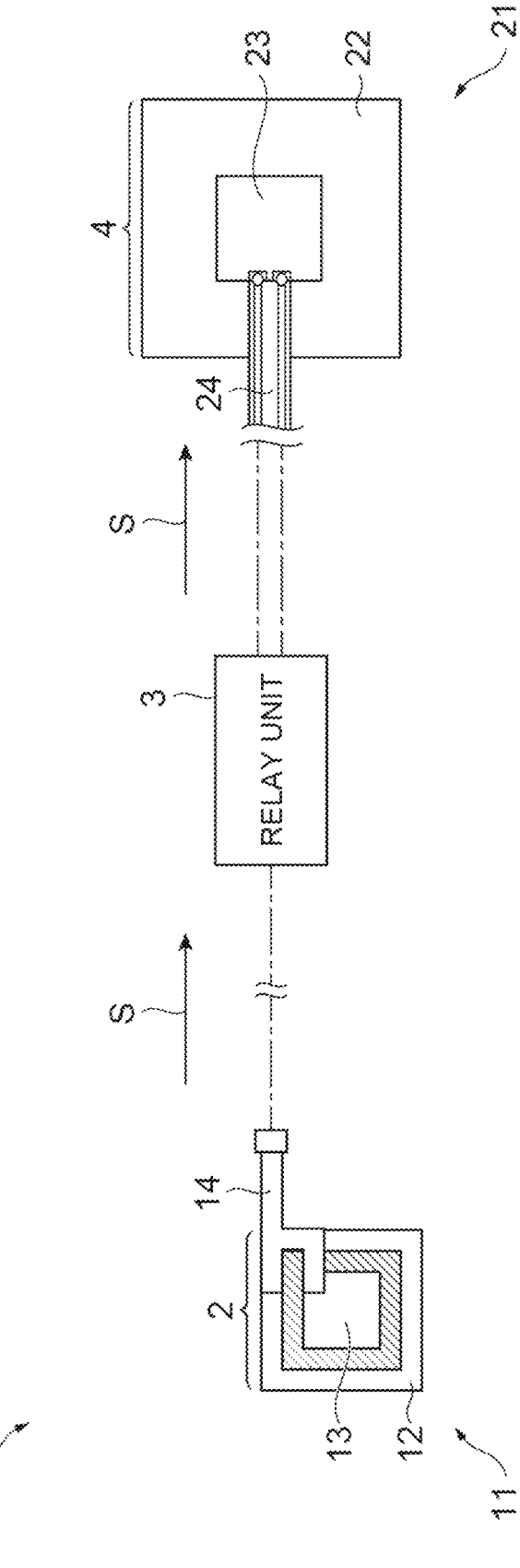
FIG. 1 is a schematic diagram illustrating a configuration of a tactile sense transmission device according to a first embodiment of the present disclosure.

FIG. 1 is a schematic diagram illustrating a configuration of a tactile sense transmission device according to a first embodiment of the present disclosure. As illustrated in FIG. 1, a tactile sense transmission device 1 according to the present embodiment includes an input unit 2, a relay unit 3, and an output unit 4. The tactile sense transmission device 1 is a device that relays a tactile sense detected by the input unit 2 by the relay unit 3 and presents the tactile sense as a tactile sense by the output unit 4 located at a position separated from the input unit 2.

The input unit 2 is a unit that generates a voltage according to a pressing force generated by contact and generates a signal S based on the generated voltage. The input unit 2 is configured by a piezoelectric sensor 11 including a piezoelectric element 13. In the present embodiment, the piezoelectric sensor 11 includes a base plate 12, a piezoelectric element 13 disposed on one surface side of the base plate 12, and a wiring member 14 electrically coupled to the base plate 12 and the piezoelectric element 13. In the piezoelectric sensor 11, electric power is generated by the piezoelectric element 13 according to the pressing force (distortion of the base plate 12) applied to the base plate 12 when the piezoelectric sensor 11 comes into contact with another object or the like. The signal S based on the electric power (hereinafter, also referred to as "generated electric power") from the piezoelectric element 13 is output to the relay unit 3 via the wiring member 14.

The piezoelectric sensor 11 may be configured in a state where the base plate 12 and the piezoelectric element 13 are exposed, but the base plate 12 and the piezoelectric element 13 may be covered with a protective cover, a laminate film, or the like. Further, the piezoelectric sensor 11 may be fixed to a part of a human body (for example, a fingertip or the like), a pen tip, or the like via a predetermined attachment member or the like.

Figure 2:
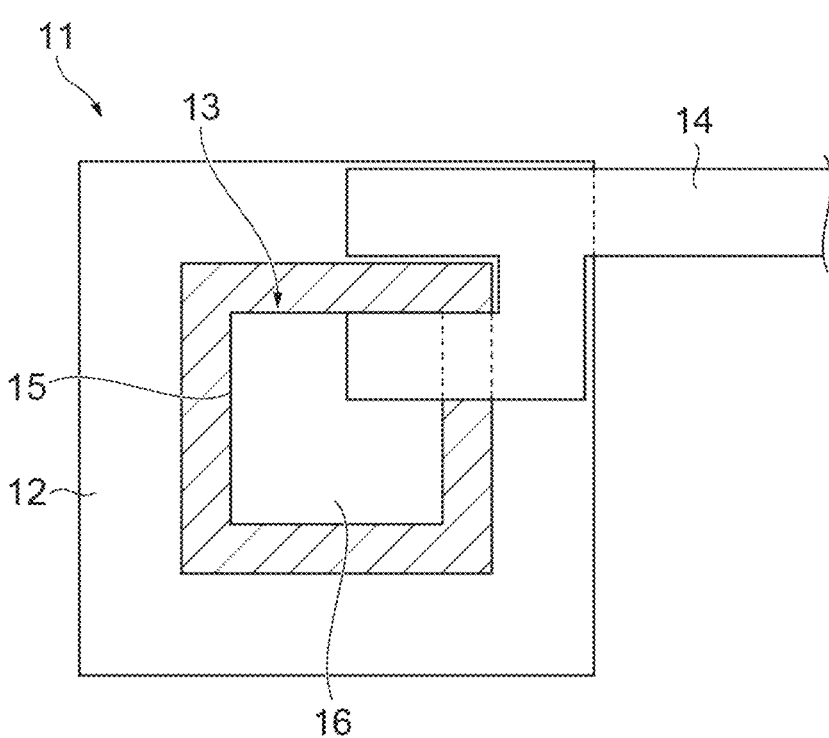
FIG. 2 is a schematic plan diagram illustrating a configuration of a piezoelectric sensor.

FIG. 2 is a schematic plan diagram illustrating a configuration of a piezoelectric sensor. As illustrated in FIG. 2, the base plate 12 has, for example, a square shape in plan view. Examples of the constituent material of the base plate 12 include Ni—Fe alloy, Ni, brass, stainless steel, and the like. The piezoelectric element 13 includes a piezoelectric element body 15 and a pair of external electrodes 16 and 16 (only one of the external electrodes 16 and 16 is illustrated in FIG. 2). The piezoelectric element body 15 has a flat rectangular parallelepiped shape. The rectangular parallelepiped shape includes a shape in which corner portions and ridge portions are chamfered and a shape in which corner portions and ridge portions are rounded.

In the present embodiment, the piezoelectric element body 15 does not have an internal electrode, and is configured by a single piezoelectric layer. The piezoelectric layer is made of a piezoelectric material. In the present embodiment, the piezoelectric layer is made of a piezoelectric ceramic material. Examples of the piezoelectric ceramic material include PZT[Pb(Zr, Ti)O$_3$], PT(PbTiO$_3$), PLZT [(Pb, La)(Zr, Ti)O$_3$], barium titanate, and the like. The piezoelectric layer is configured by, for example, a sintered body of a ceramic green sheet including the above-described piezoelectric ceramic material.

The external electrode 16 is made of a conductive material. Examples of the conductive material include Ag, Pd, an Ag—Pd alloy, and the like. The external electrode 16 is configured by, for example, a sintered body of a conductive paste including the above-described conductive material.

The wiring member 14 is configured by, for example, a flexible printed circuit board (FPC). The wiring member 14 has, for example, a structure in which a conductor is covered with a cover material. The conductor is made of a material having excellent conductivity, such as copper. The cover material is made of, for example, a non-conductive resin such as a polyimide resin. A distal end portion (end portions on the piezoelectric element 13 side) of the wiring member 14 branches into two. One of the two branched end portions is electrically coupled to one of the external electrodes 16 and 16. The other of the two branched end portions is coupled to the base plate 12, and is electrically coupled to the other of the external electrodes 16 and 16 via the base plate 12. A base end portion (end portion on the relay unit 3 side) of the wiring member 14 is electrically coupled to the relay unit 3.

As illustrated in FIG. 1, the relay unit 3 is a unit that relays the signal S from the input unit 2 and adjusts a value of the signal S. In the present embodiment, the relay unit 3 is configured by a signal amplifier, amplifies the value of the signal S input from the input unit 2 at a predetermined magnification, and outputs the amplified signal to the output unit 4. An amplification magnification of the signal S by the relay unit 3 is not particularly limited, but the amplification magnification is set to, for example, 6 times to 12 times.

The output unit 4 is a unit that outputs vibration based on the signal S relayed by the relay unit 3. That is, by outputting vibration based on the signal S, the output unit 4 restores the contact detected by the piezoelectric sensor 11 configuring the input unit 2 and presents the contact as a tactile sense. The output unit 4 is configured by a vibrator 21 including a piezoelectric element 23 and vibrating based on the signal S. In the present embodiment, the vibrator 21 includes a diaphragm 22, the piezoelectric element 23 disposed on one surface side of the diaphragm 22, and a wiring member 24 electrically coupled to the piezoelectric element 23.

An operating frequency of the piezoelectric sensor 11 described above is higher than an operating frequency of the vibrator 21. In the present embodiment, for example, the operating frequency of the piezoelectric sensor 11 is about 11 kHz, whereas the operating frequency of the vibrator 21 is about 200 Hz to 1.5 kHz. The operating frequency of the piezoelectric sensor 11 can be adjusted based on the dimension or the like of the piezoelectric element 13 including the base plate 12. The operating frequency of the vibrator 21 can be adjusted based on the dimension or the like of the piezoelectric element 23 including the diaphragm 22. Here, since the dimension (planar dimension) of the piezoelectric element 13 configuring the piezoelectric sensor 11 is smaller than the dimension (planar dimension) of the piezoelectric element 23 configuring the vibrator 21, the above-described relationship of the operating frequency is satisfied.

In the present embodiment, by making a planar shape of the vibrator 21 larger than a planar shape of the piezoelectric sensor 11, the above-described relationship between the operating frequency of the piezoelectric sensor 11 and the operating frequency of the vibrator 21 is satisfied. As a result, a frequency band of the generated voltage output from the piezoelectric element 13 on the input unit 2 side can be covered by the piezoelectric element 13 on the output unit 4 side, and various contacts detected by the input unit 2 can be restored by the output unit 4 and presented as a tactile sense.

Figure 3:
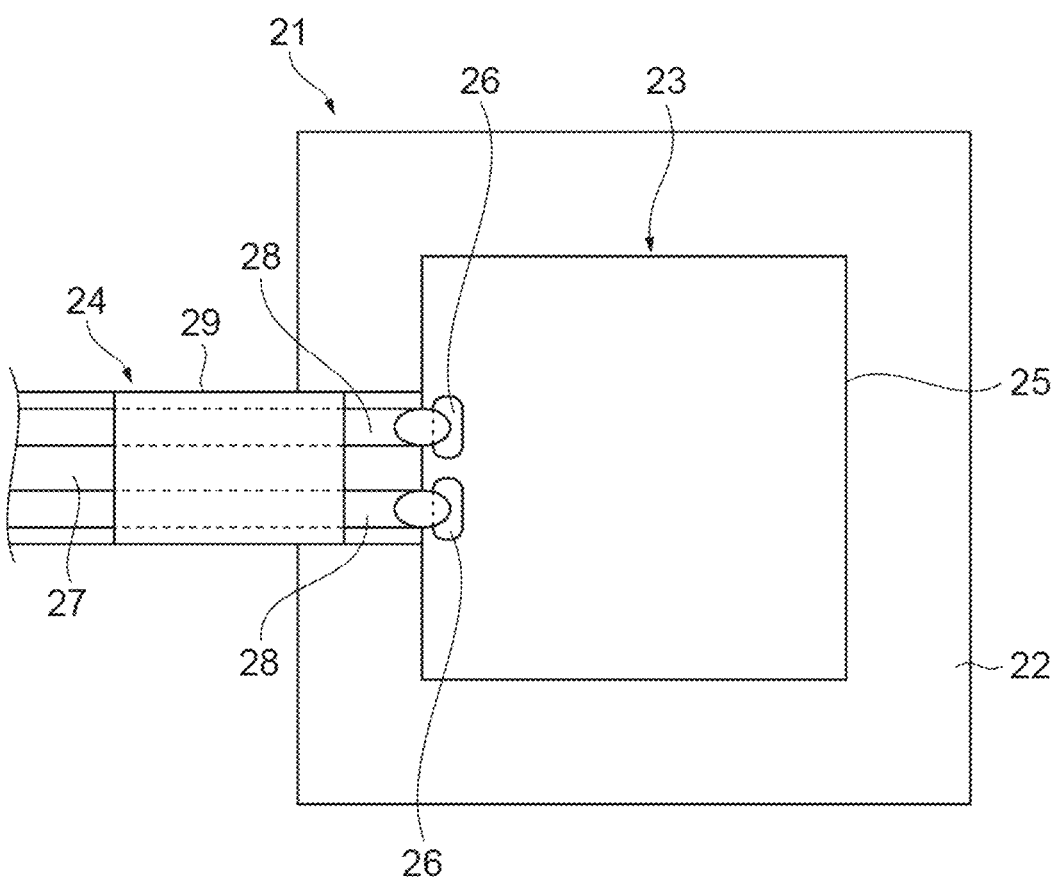
FIG. 3 is a schematic plan diagram illustrating a configuration of a vibrator.

FIG. 3 is a schematic plan diagram illustrating a configuration of a vibrator. As illustrated in FIG. 3, the diaphragm 22 has, for example, a square shape in plan view. Examples of the constituent material of the diaphragm include Ni—Fe alloy, Ni, brass, stainless steel, and the like. The piezoelectric element 23 includes a piezoelectric element body 25, an internal electrode (not illustrated), and a pair of external electrodes 26 and 26. The piezoelectric element body 25 has a flat rectangular parallelepiped shape. The rectangular parallelepiped shape includes a shape in which corner portions and ridge portions are chamfered and a shape in which corner portions and ridge portions are rounded. In the vibrator 21, the diaphragm 22 may be omitted, and only piezoelectric element 23 may configure the vibrator 21.

The piezoelectric element body 25 is formed by laminating a plurality of piezoelectric layers. The piezoelectric layer is made of a piezoelectric material. In the present embodiment, the piezoelectric layer is made of a piezoelectric ceramic material. Examples of the piezoelectric ceramic material include PZT[Pb(Zr, Ti)O$_3$], PT(PbTiO$_3$), PLZT [(Pb, La)(Zr, Ti)O$_3$], barium titanate, and the like. The piezoelectric layer is configured by, for example, a sintered body of a ceramic green sheet including the above-described piezoelectric ceramic material. In the actual piezoelectric element body 25, the piezoelectric layers are integrated to such an extent that boundaries between the piezoelectric layers cannot be recognized.

The internal electrode and the external electrode 26 are made of a conductive material. Examples of the conductive material include Ag, Pd, an Ag—Pd alloy, and the like. The internal electrode and the external electrode are configured by, for example, a sintered body of a conductive paste including the above-described conductive material.

The wiring member 24 is configured by, for example, a flexible printed circuit board (FPC). The wiring member 14 has a base member 27, a pair of conductors 28 and 28, and a cover 29. The base member 27 is made of an electrically insulating material such as a polyimide resin. The conductors 28 and 28 are made of a conductive material such as copper. The conductors 28 and 28 are joined to the base member 27 in a state of being separated from each other by adhesion or the like.

Similarly to the base member 27, the cover 29 is made of an electrically insulating material such as a polyimide resin. The cover 29 is disposed so as to cover parts of the conductors 28 and 28, and is joined to the base member 27 by adhesion or the like. End portions of the conductors 28 and 28 are exposed from the cover 29. The exposed portions of the conductors 28 and 28 from the cover 29 may be plated with nickel or gold. The distal end portions of the wiring member 14 (conductors 28 and 28 at end portions on the piezoelectric element 13 side) are electrically coupled to the external electrodes 26 and 26, respectively. The base end portions of the wiring member 14 (conductors 28 and 28 at end portion on the relay unit 3 side) are electrically coupled to the relay unit 3.

Figure 4A:
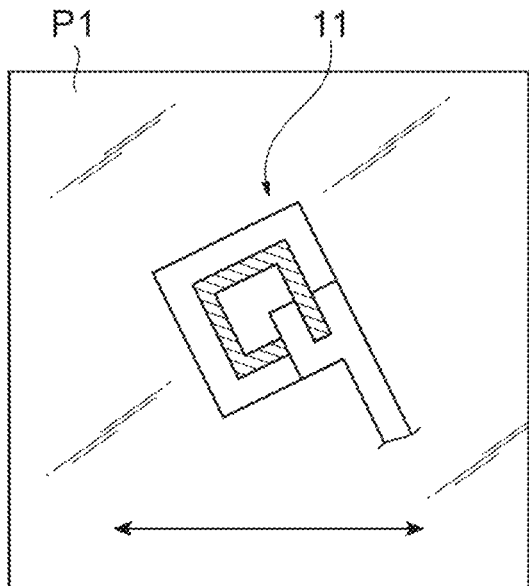
FIG. 4A is a diagram illustrating detection of contact of a smooth surface by the piezoelectric sensor.
Figure 4B:
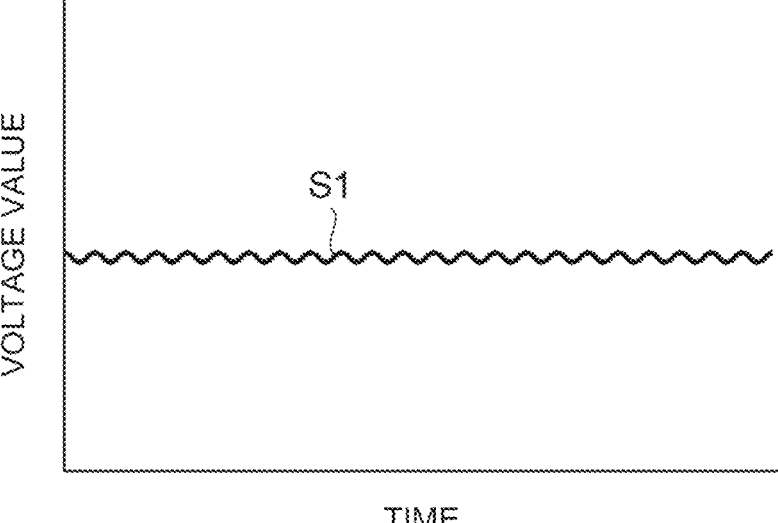
FIG. 4B is a diagram illustrating a waveform of a generated voltage in FIG. 4A.

In the tactile sense transmission device 1 having the above configuration, the contact with another object or the like detected by the piezoelectric sensor 11 is expressed by an amplitude and a frequency of the voltage generated by the piezoelectric element 13. As illustrated in FIG. 4A, when the piezoelectric sensor 11 slides on a smooth surface (smooth surface) P1, as illustrated in FIG. 4B, a generated voltage having a small amplitude and a high frequency is generated, and the generated voltage is output as a signal S from the input unit 2 to the output unit 4 via the relay unit 3. In the output unit 4, the vibrator 21 vibrates based on the signal S, and a smooth tactile sense similar to that when actually touching the smooth surface P1 is presented.

Figure 5A:
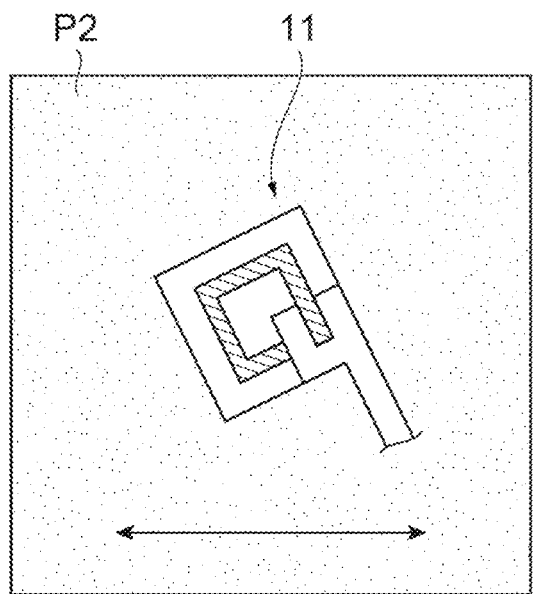
FIG. 5A is a diagram illustrating detection of contact of a slightly rough surface by the piezoelectric sensor.
Figure 5B:
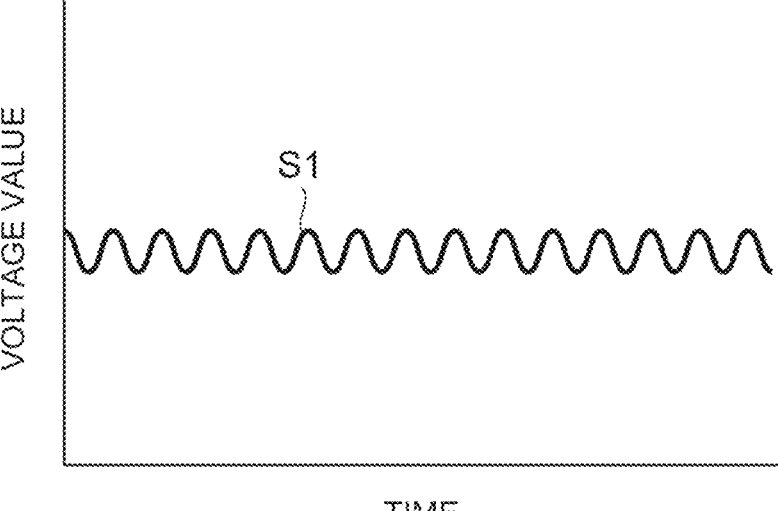
FIG. 5B is a diagram illustrating a waveform of a generated voltage in FIG. 5A.

As illustrated in FIG. 5A, when the piezoelectric sensor 11 slides on a slightly rough surface (slightly rough surface) P2, as illustrated in FIG. 5B, a generated voltage having a larger amplitude and a lower frequency than those in FIG. 4B is generated, and a signal S based on the generated voltage is output from the input unit 2 to the output unit 4 via the relay unit 3. In the output unit 4, the vibrator 21 vibrates based on the signal S, and a slightly rough tactile sense similar to that when actually touching the slightly rough surface P2 is presented.

Figure 6A:
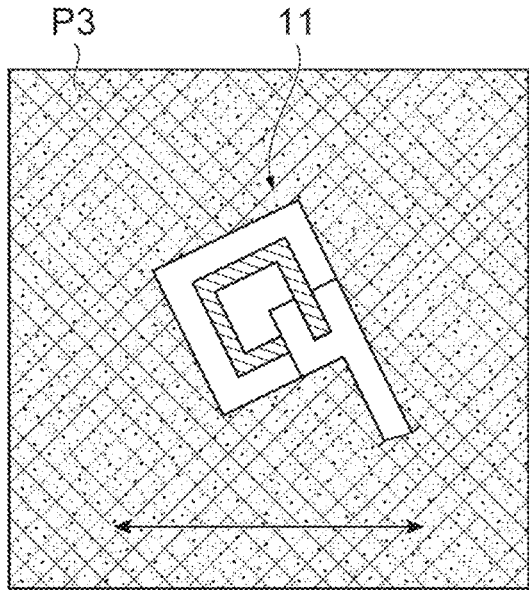
FIG. 6A is a diagram illustrating detection of contact of a rough surface by the piezoelectric sensor.
Figure 6B:
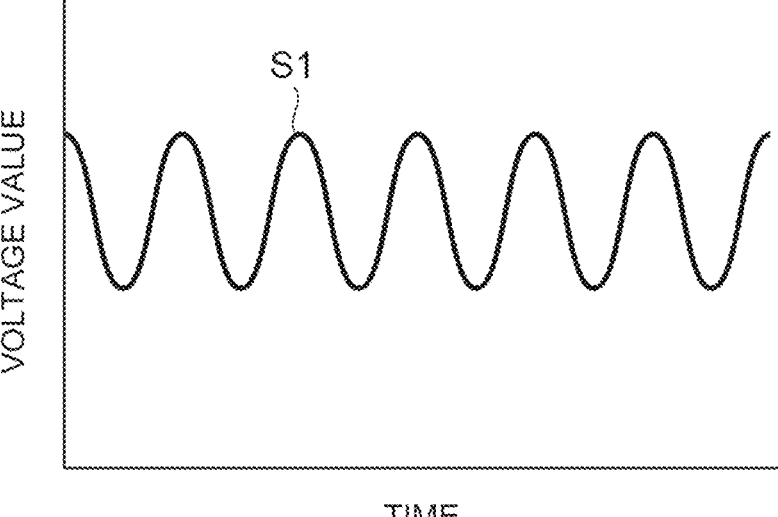
FIG. 6B is a diagram illustrating a waveform of a generated voltage in FIG. 6A.

As illustrated in FIG. 6A, when the piezoelectric sensor 11 slides on a rough surface (rough surface) P3, as illustrated in FIG. 6B, a generated voltage having a larger amplitude and a lower frequency than those in FIG. 4B is generated, and a signal S based on the generated voltage is output from the input unit 2 to the output unit 4 via the relay unit 3. In the output unit 4, the vibrator 21 vibrates based on the signal S, and a rough tactile sense similar to that when the rough surface P3 is actually touched is presented.

Figure 7:
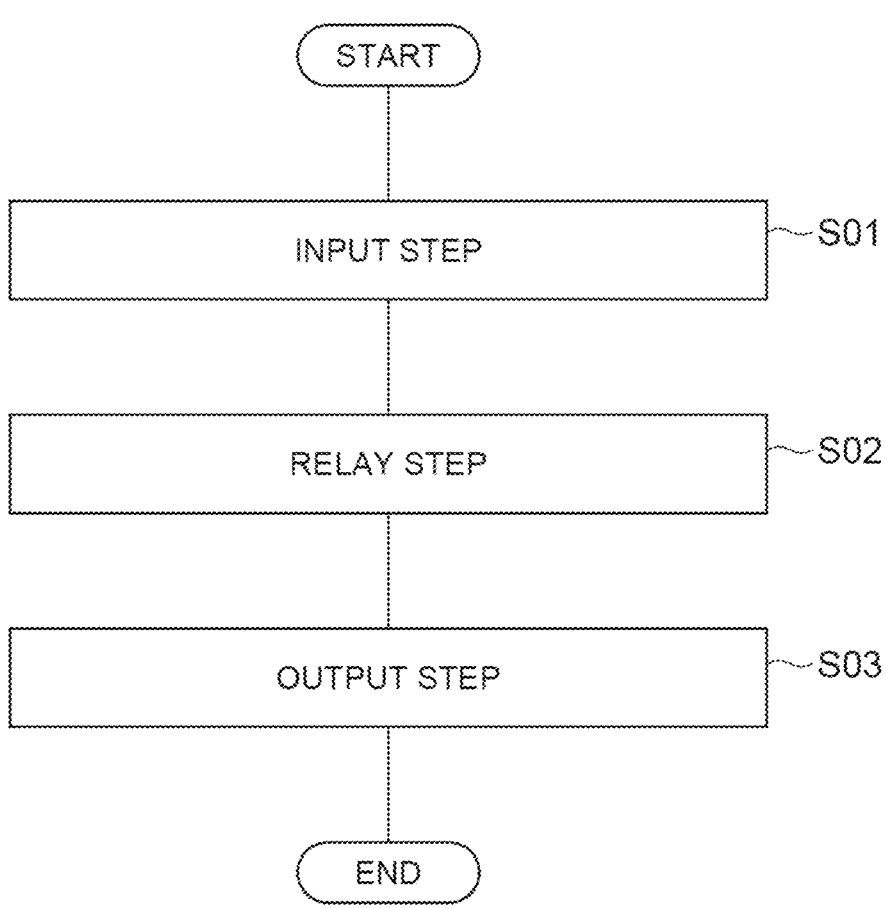
FIG. 7 is a flowchart illustrating a tactile sense transmission method according to an embodiment of the present disclosure.

FIG. 7 is a flowchart illustrating a tactile sense transmission method according to the embodiment of the present disclosure. As illustrated in FIG. 7, the tactile sense transmission method includes an input step S01, a relay step S02, and an output step S03.

The input step S01 is a step of generating a signal S based on a generated voltage in the input unit 2 configured by the piezoelectric sensor 11 including the piezoelectric element 13. In the input step S01, the piezoelectric sensor 11 generates a voltage according to the pressing force generated by the contact, and outputs a signal S based on the generated voltage to the relay unit 3.

The relay step S02 is a step of relaying the signal S from the input unit 2 and adjusting a value of the signal S in the relay unit 3. In the relay step S02, the relay unit 3 amplifies the signal S received from the input unit 2 and outputs the amplified signal S to the output unit 4. The output step S03 is a step of outputting vibration based on the signal S relayed by the relay unit 3, in the output unit 4 configured by the vibrator 21 including the piezoelectric element 23. In the output step S03, the vibrator 21 vibrates based on the signal S, and a tactile sense according to the contact detected by the input unit 2 is presented.

As described above, in the tactile sense transmission device 1 and the tactile sense transmission method, the signal S based on the voltage (generated voltage) generated in the input unit 2 is relayed by the relay unit 3, and vibration based on the signal S is output from the output unit 4. Therefore, in the tactile sense transmission device 1, the tactile sense detected by the input unit 2 can be presented by the output unit 4 at a remote position. In addition, in the tactile sense transmission device 1, the input unit 2 is configured by the piezoelectric sensor 11 including the piezoelectric element 13, and the output unit 4 is configured by the vibrator 21 including the piezoelectric element 23. As described above, since both the input unit 2 and the output unit 4 include a piezoelectric element, it is possible to realize high responsiveness of the output with respect to the input as compared with a case where the input unit and the output unit are configured by combining a piezoelectric element and a voice coil, for example.

In the present embodiment, the relay unit 3 amplifies a value of the signal S and outputs the amplified signal to the output unit 4. As a result, a clearer tactile sense can be presented in the output unit 4. In the present embodiment, the operating frequency of the piezoelectric sensor 11 is higher than the operating frequency of the vibrator 21. By having such a relationship of the operating frequency, the output with respect to the input can be optimized.

Second Embodiment

Figure 8:
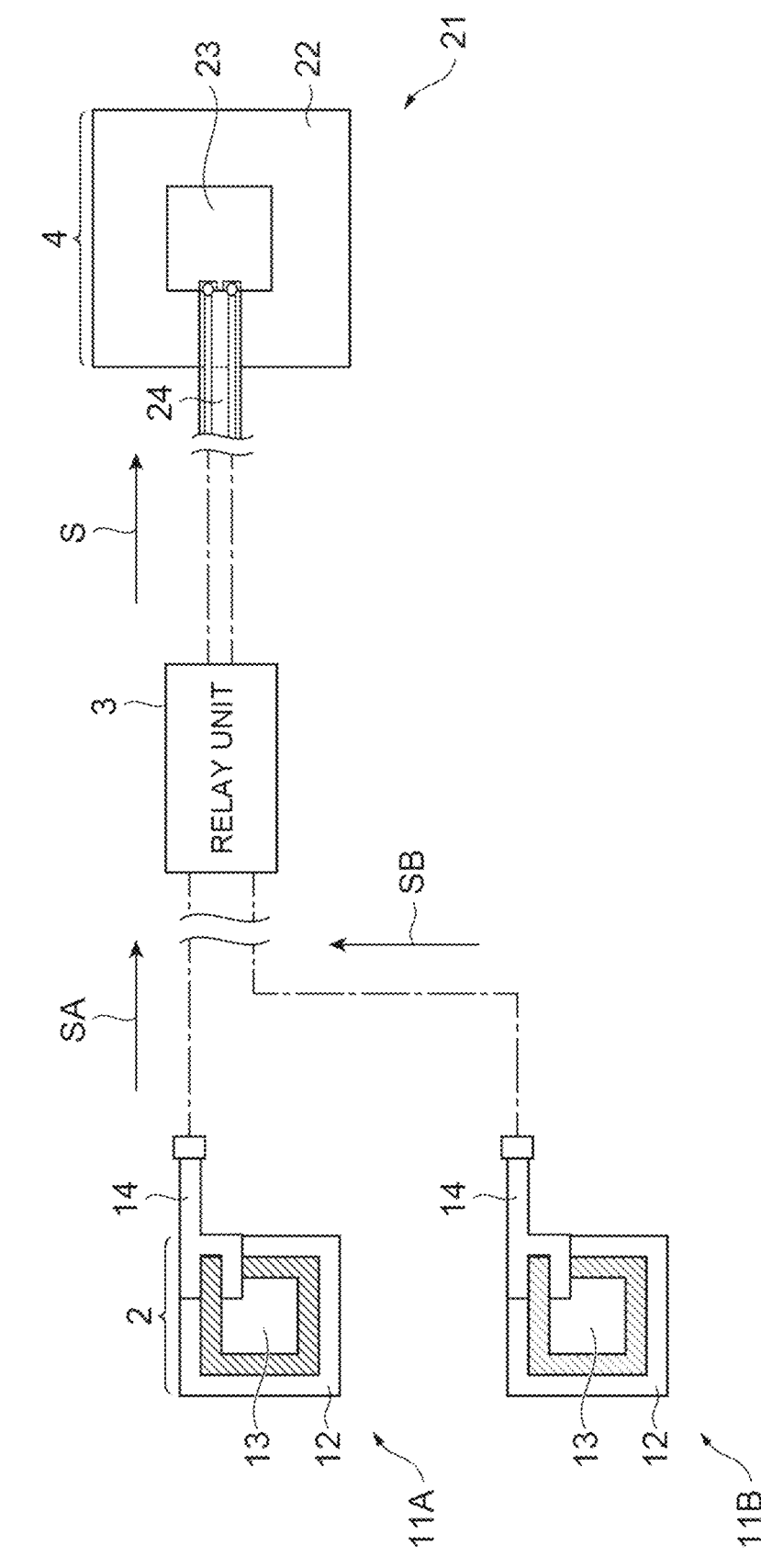
FIG. 8 is a schematic diagram illustrating a configuration of a tactile sense transmission device according to a second embodiment of the present disclosure.

FIG. 8 is a schematic diagram illustrating a configuration of a tactile sense transmission device according to a second embodiment of the present disclosure. As illustrated in FIG. 8, a tactile sense transmission device 1A according to the second embodiment is different from the first embodiment in which the input unit 2 includes the single piezoelectric sensor 11 in that the input unit 2 has a plurality of piezoelectric sensors 11.

More specifically, in the tactile sense transmission device 1A, the input unit 2 has a plurality of piezoelectric sensors 11 having different operating frequencies. In the example of FIG. 8, the input unit 2 has two piezoelectric sensors 11A and 11B. An operating frequency of the piezoelectric sensor 11A is, for example, about 11 kHz. An operating frequency of the piezoelectric sensor 11B is, for example, 200 Hz to 1.5 kHz. In the relay unit 3, a signal SA from the piezoelectric sensor 11A and a signal SB from the piezoelectric sensor 11B are superimposed, and the superimposed signal S is amplified. The amplified superimposed signal S is output from the relay unit 3 to the output unit 4.

Figure 9:
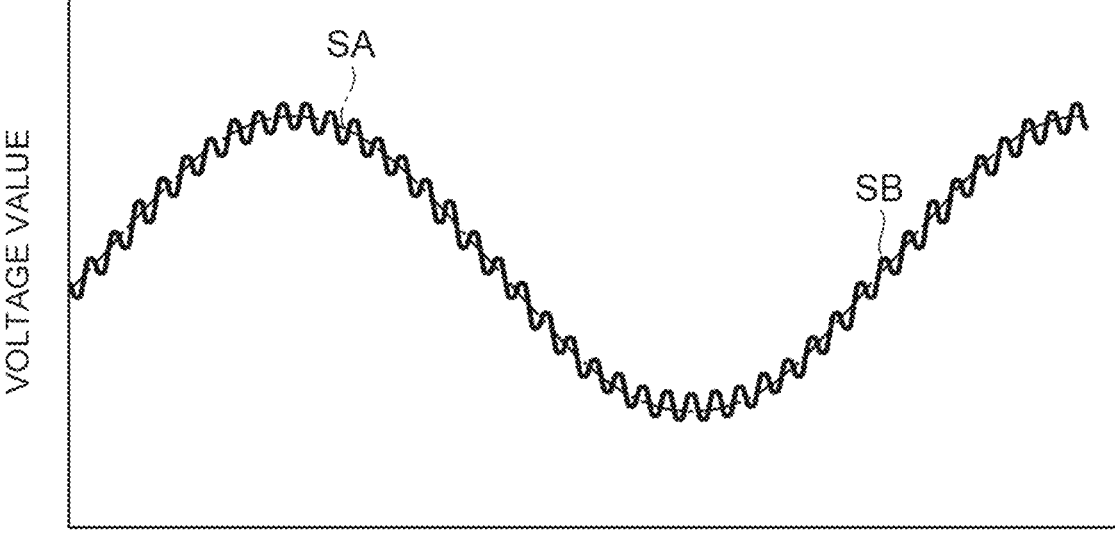
FIG. 9 is a diagram illustrating an example of a signal output from an input unit to a relay unit of the tactile sense transmission device illustrated in FIG. 8.

Also in such a tactile sense transmission device 1A, similarly to the first embodiment, it is possible to transmit a tactile sense to a remote position with high responsiveness. In addition, in the tactile sense transmission device 1A, the input unit 2 includes a plurality of piezoelectric sensors 11 having different operating frequencies. As a result, a more detailed tactile sense can be presented. In the present embodiment, for example, as illustrated in FIG. 9, a large uneven surface can be detected by the piezoelectric sensor 11A having a relatively small operating frequency (signal SA), and fine unevenness in the uneven surface can be detected by the piezoelectric sensor 11B having a relatively large operating frequency (signal SB). Therefore, by superimposing the signal SA and the signal SB and outputting vibration by the output unit 4, it is possible to present a tactile sense with respect to minute unevenness on the uneven surface.

In the example of FIG. 8, the input unit 2 is configured by the two piezoelectric sensors 11A and 11B, but the input unit 2 may be configured by three or more piezoelectric sensors

11. In addition, the output unit 4 may include a plurality of vibrators 21. In this case, the signal S of each of the plurality of piezoelectric sensors 11 may be output in one-to-one correspondence with each of the plurality of vibrators 21, or the signal S of each of the plurality of piezoelectric sensors 11 may be arbitrarily superimposed according to a purpose, and the superimposed signal may be output from an arbitrary vibrator 21.

Third Embodiment

Figure 10:
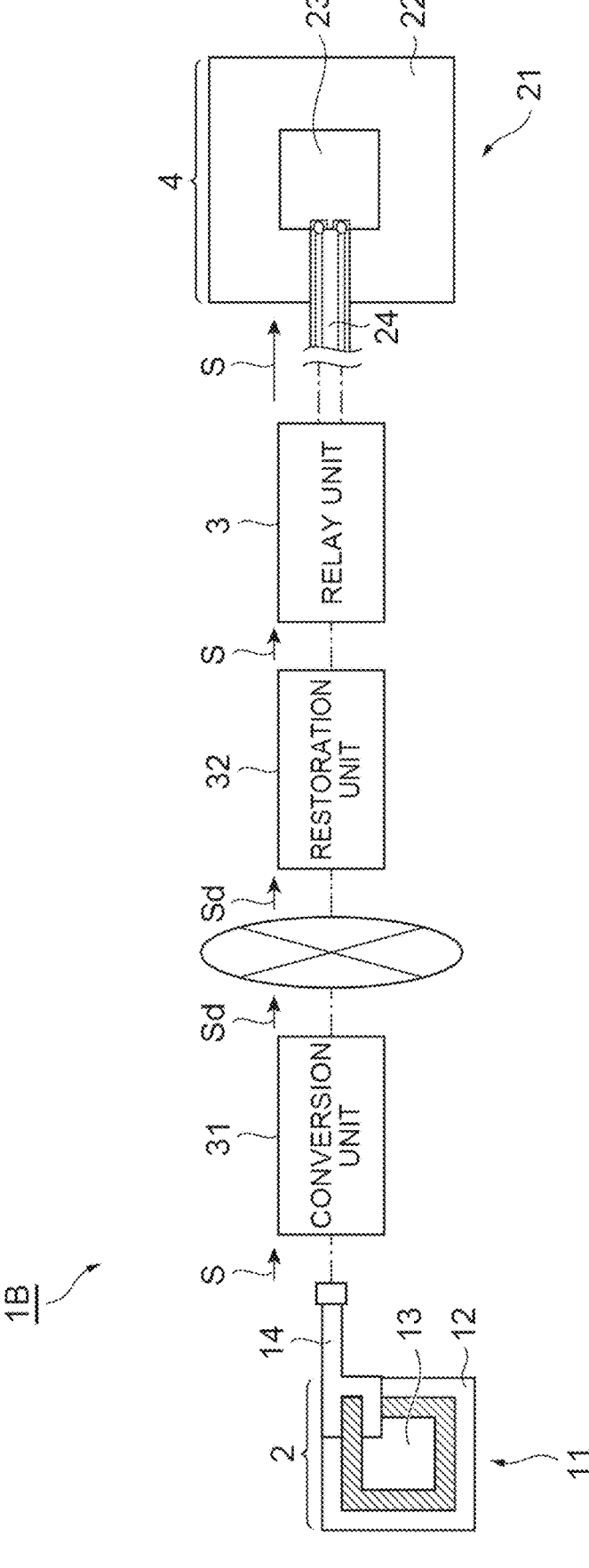
FIG. 10 is a schematic diagram illustrating a configuration of a tactile sense transmission device according to a third embodiment of the present disclosure.

FIG. 10 is a schematic diagram illustrating a configuration of a tactile sense transmission device according to a third embodiment of the present disclosure. As illustrated in FIG. 10, a tactile sense transmission device 1B according to the third embodiment is different from the tactile sense transmission device 1 according to the first embodiment in a method of transmitting the signal S from the input unit 2 to the output unit 4.

Specifically, the tactile sense transmission device 1B further includes a conversion unit 31 that converts the signal S from the input unit 2 into an audio signal Sd, and a restoration unit 32 that receives the audio signal Sd from the conversion unit 31 via a network N, restores the audio signal Sd to the signal S before conversion, and outputs the signal S to the relay unit 3. The audio signal Sd is not particularly limited as long as it can be transmitted and received via the network N, and for example, a digital audio signal compressed using an audio file format such as MP3 can be used.

The conversion unit 31 and the restoration unit 32 are physically a computer system including a memory such as a RAM and a ROM, a processor such as a CPU, a communication interface, a storage unit such as a hard disk, a display, and the like. Examples of the configuration of the conversion unit 31 and the restoration unit 32 include a personal computer, a cloud server, a smart device (smartphone and tablet terminal), and the like.

Even in such a tactile sense transmission device 1B, a tactile sense can be transmitted to a remote position with high responsiveness as in the first embodiment. Furthermore, in the present embodiment, by including the conversion unit 31 and the restoration unit 32 described above, the tactile sense detected by the input unit 2 can be presented by the output unit 4 at a further remote position via the network N. Therefore, convenience is further improved. Note that the configuration of the second embodiment may be further combined with the tactile sense transmission device 1B. That is, in the tactile sense transmission device 1B, the input unit 2 may include a plurality of piezoelectric sensors 11 having different operating frequencies. According to such a configuration, a more detailed tactile sense detected by each of the plurality of piezoelectric sensors 11 can be presented by the output unit 4 located at a further remote position.

What is claimed is:

1. A tactile sense transmission device comprising:
   an input unit configured to generate a voltage according to a pressing force generated by contact and generate a signal based on the generated voltage;
   a relay configured to relay the signal from the input unit and adjust a value of the signal; and
   an output unit configured to output vibration based on the signal relayed by the relay, wherein
   the input unit is configured by a piezoelectric sensor including a piezoelectric element,
   the output unit is configured by a vibrator including a piezoelectric element and vibrating based on the signal, the signal generated by the input unit is a tactile sense signal based on contact between the piezoelectric sensor and another object, and in the output unit, a tactile sense due to contact between the piezoelectric sensor and the another object is restored based on the tactile sense signal.

2. The tactile sense transmission device according to claim 1, wherein the relay amplifies a value of the signal and outputs the amplified signal to the output unit.

3. The tactile sense transmission device according to claim 1, wherein an operating frequency of the piezoelectric sensor is higher than an operating frequency of the vibrator.

4. The tactile sense transmission device according to claim 1, wherein the input unit has a plurality of piezoelectric sensors having different operating frequencies.

5. The tactile sense transmission device according to claim 1, further comprising:

a converter configured to convert the signal from the input unit into an audio signal; and a restorer configured to receive the audio signal from the converter via a network, restore the audio signal to a signal before conversion, and output the signal to the relay.

6. A tactile sense transmission method comprising:

generating a voltage according to a pressing force generated by contact and generating a signal based on the generated voltage in an input unit configured by a piezoelectric sensor including a piezoelectric element;

relaying the signal from the input unit and adjusting a value of the signal in a relay; and outputting vibration based on the signal relayed by the relay in an output unit configured by a vibrator including a piezoelectric element, wherein:

the signal generated by the input unit is a tactile sense signal based on contact between the piezoelectric sensor and another object, and in the output unit, a tactile sense due to contact between the piezoelectric sensor and the another object is restored based on the tactile sense signal.

* * * * *